H. R. OLIVER & G. P. OHLGART.
SHOE POLISHING MACHINE.
APPLICATION FILED MAR. 13, 1908.
953,919.
Patented Apr. 5, 1910.
6 SHEETS—SHEET 1.
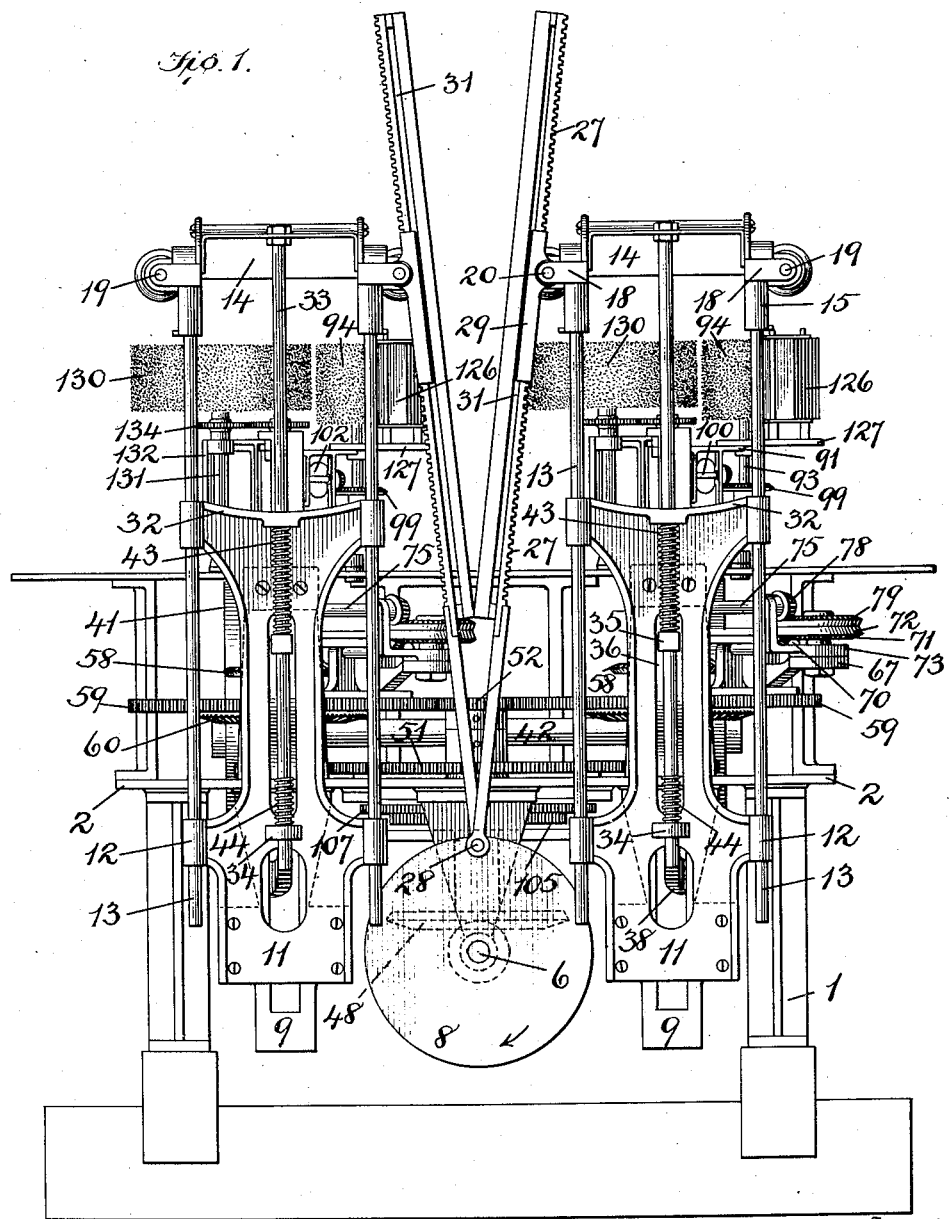

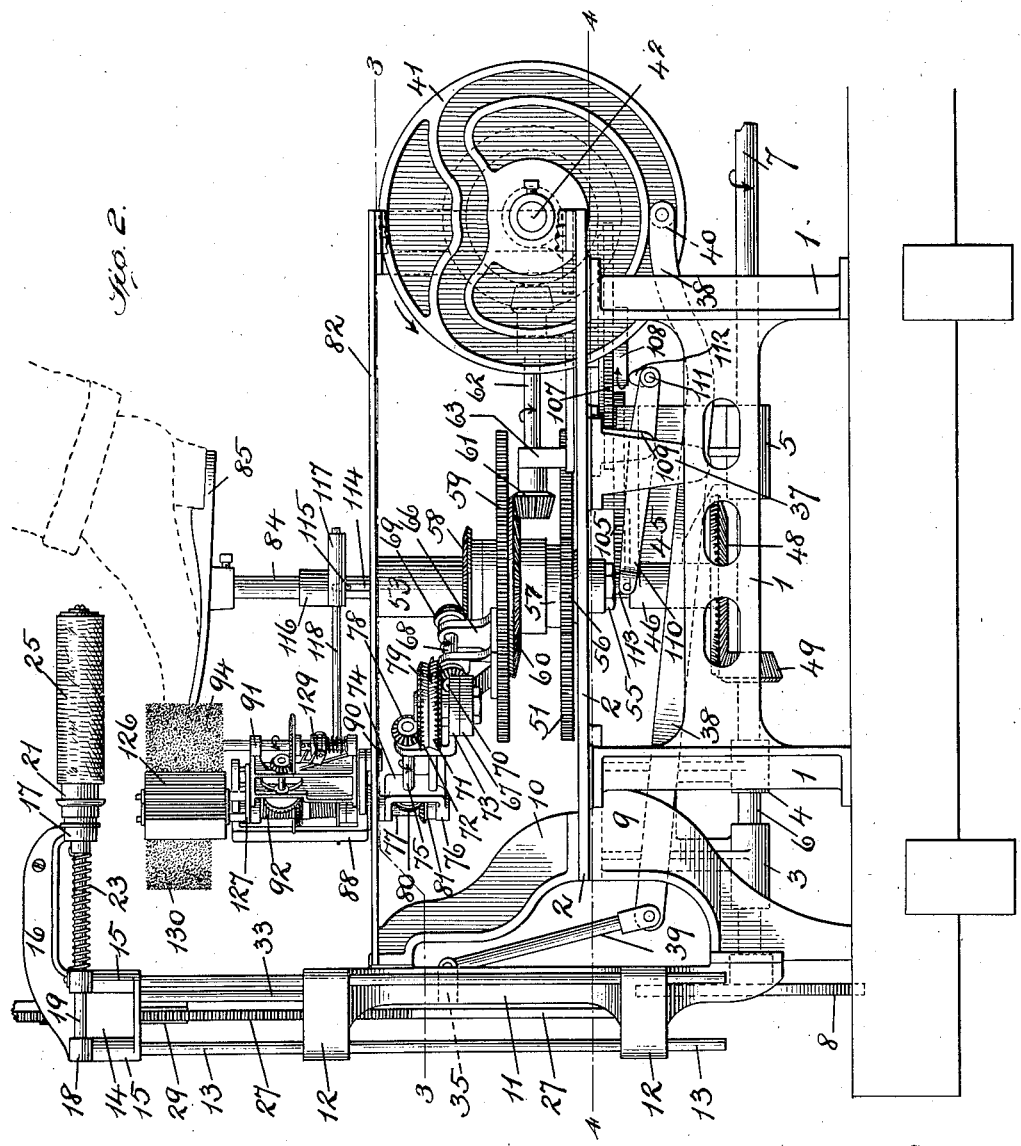

H. R. OLIVER & G. P. OHLGART.
SHOE POLISHING MACHINE.
APPLICATION FILED MAR. 13, 1908.
953,919.
Patented Apr. 5, 1910.
6 SHEETS—SHEET 3.
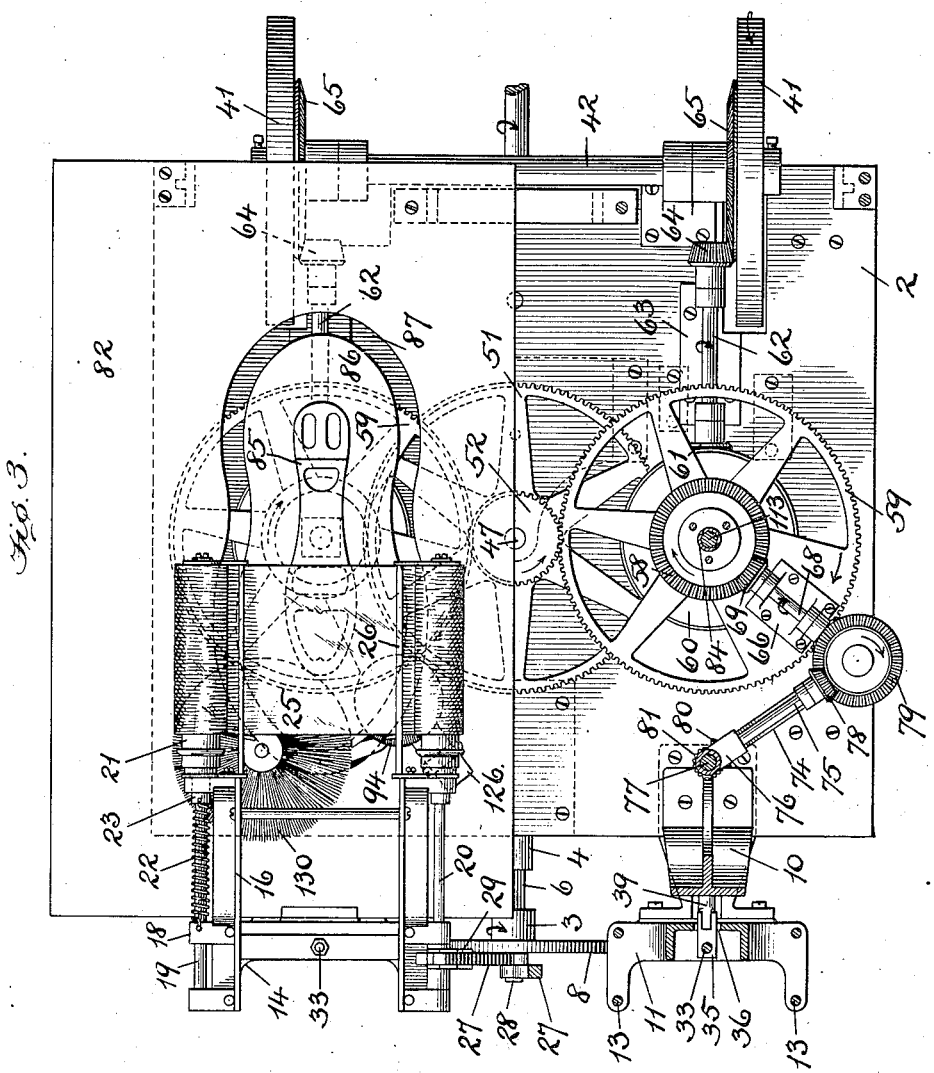
Witnesses
Edwin L. Bradford.
G. Ferdinand Vogt.
Inventors
Herbert R. Oliver
George P. Ohlgart
By Mann & Co.
Attorneys

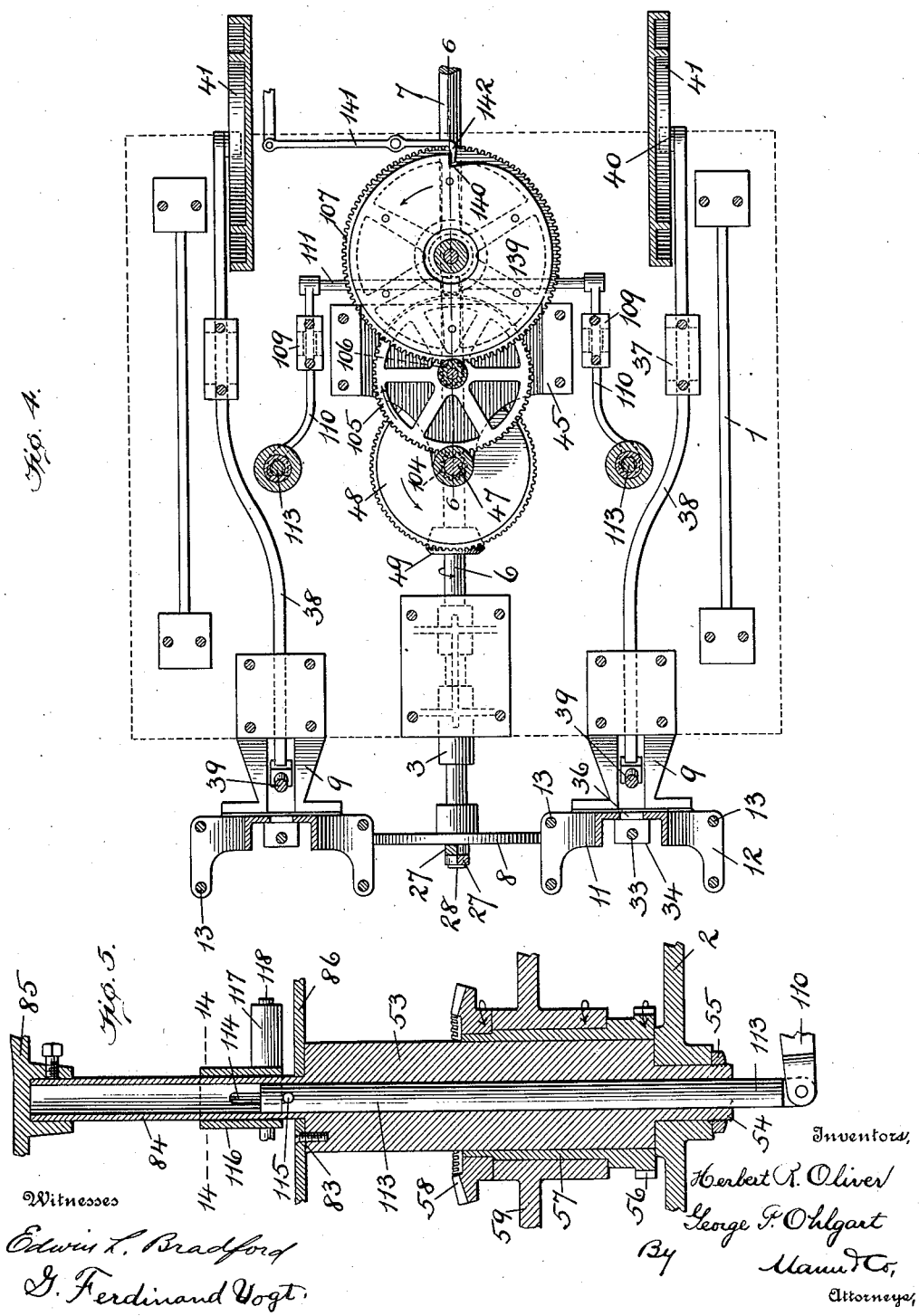

H. R. OLIVER & G. P. OHLGART.
SHOE POLISHING MACHINE.
APPLICATION FILED MAR. 13, 1908.
953,919.
Patented Apr. 5, 1910.
6 SHEETS—SHEET 5.
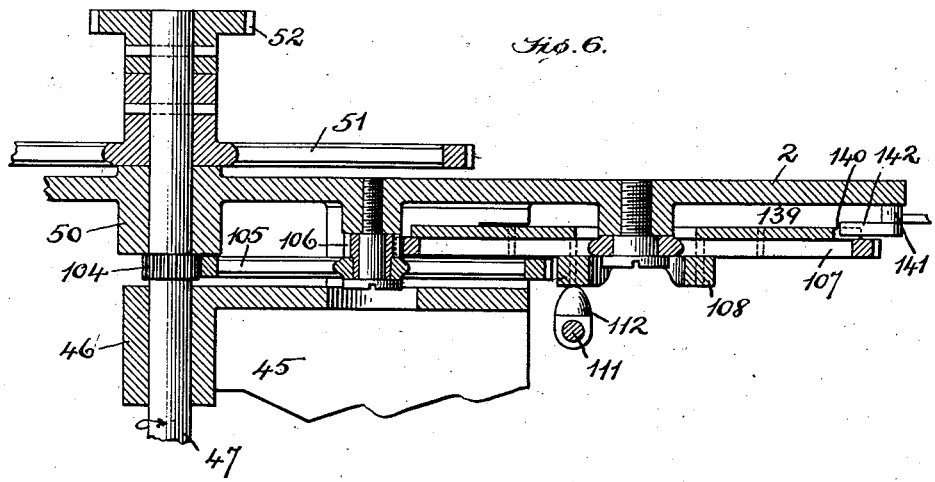
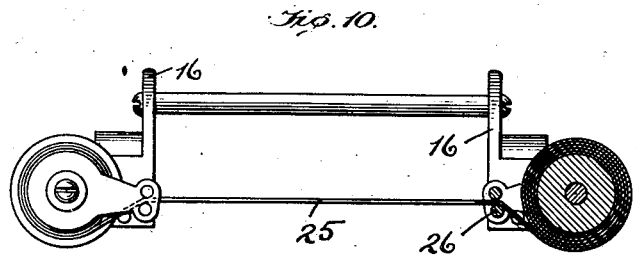
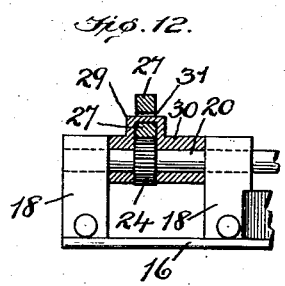
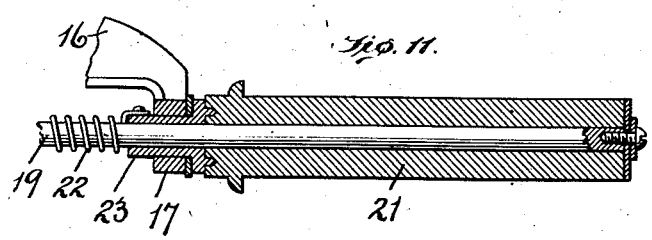
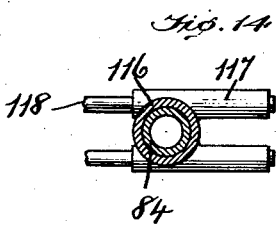
Witnesses
Edwin L. Bradford.
J. Ferdinand Vogt.
Inventors
Herbert R. Oliver
George P. Ohlgart
By Mann & Co
Attorneys

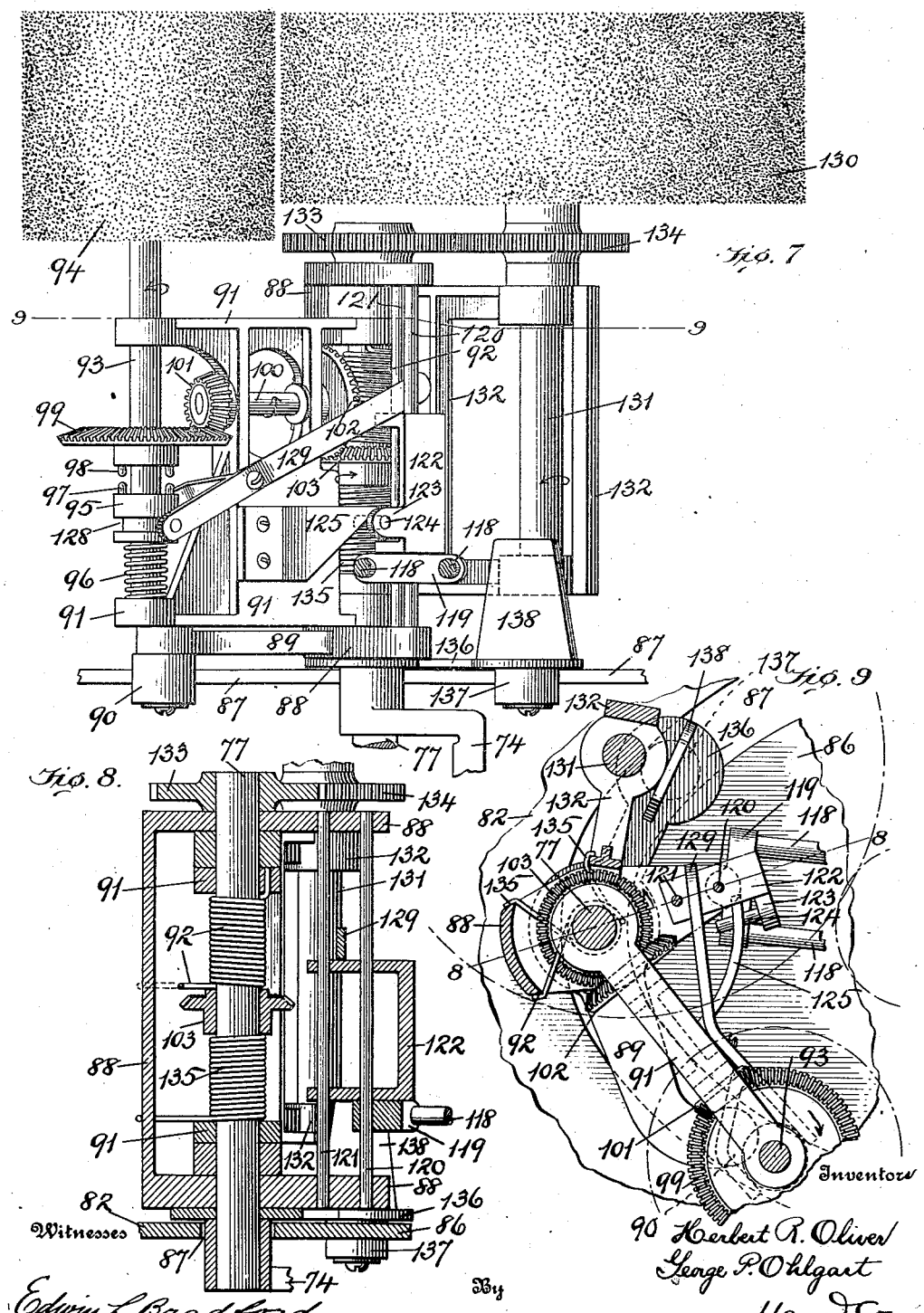

UNITED STATES PATENT OFFICE.

HERBERT R. OLIVER AND GEORGE P. OHLGART, OF BALTIMORE, MARYLAND, ASSIGNORS, BY DIRECT AND MESNE ASSIGNMENTS, TO THE AMERICAN AUTOMATIC SHOE POLISHING MACHINE CO., OF BALTIMORE, MARYLAND, A CORPORATION OF NEW JERSEY.

SHOE-POLISHING MACHINE.

953,919.  Specification of Letters Patent.  Patented Apr. 5, 1910.

Application filed March 13, 1908. Serial No. 420,914.

*To all whom it may concern:*

Be it known that we, HERBERT R. OLIVER and GEORGE P. OHLGART, citizens of the United States, residing at Baltimore, in the State of Maryland, have invented certain new and useful Improvements in Shoe-Polishing Machines, of which the following is a specification.

This invention relates to machines for polishing boots or shoes and has particular reference to, and is an improvement of the machine shown and described in Letters Patent 794,540 granted to us on the eleventh day of July nineteen hundred and five, in which a side-polishing device is employed to polish the side portions of a shoe and a toe-polisher is operated to polish the toe of the shoe.

The present invention has for its object to generally improve machines of this class both in construction and operation; to make them more rapid in effecting the polishing of the shoe and to provide such movements in accomplishing the result as will eliminate objectionable noise, jar and vibration to the parts and the resultant racking of the machine usually accompanying the same.

Another object of the invention is to combine a rotary side polishing device with an improved mechanism for polishing the toe of the shoe and to impart such movements to the two polishers as will enable them to thoroughly clean and polish the shoe simultaneously without interfering with each other.

The invention is illustrated in the accompanying drawings, in which,—

Figure 1 shows a front elevation of the machine. Fig. 2 a side elevation of the same. Fig. 3 a sectional plan view of the same,—the section at one side being taken on the line 3—3 of Fig. 2. Fig. 4 also illustrates a sectional plan of the machine—the section being taken on the line 4—4 of Fig. 2. Fig. 5 shows a vertical section through one of the tubular supports and the gears carried thereby. Fig. 6 illustrates a vertical sectional view through the central rear portion of the bed plate, the section being taken on the line 6—6 of Fig. 4. Figs. 7, 8 and 9 show side elevation, sectional and plan views respectively of the swinging polisher and polish-applying devices and their immediate coacting devices. Figs. 10 and 11 illustrate in detail the toe polishing rolls. Fig. 12 shows a detail of the driving mechanism of one of the polishing roll shafts. Fig. 13 illustrates in perspective the cam for throwing the polish-applying mechanism into and out of operation, and Fig. 14 shows a sectional plan view of the tubular extension and rod supports shown in Fig. 5,—the section being taken on the line 14—14 of said Fig. 5.

Referring to the drawing the numeral, 1, designates the vertical side frames which support a horizontal bed plate, 2. Suitable bracket bearings, 3, 4, and, 5, are secured to the bottom side of the bed plate and hang pendently therefrom so as to embrace and support a main horizontal driving shaft, 6, which has a central position between the two side frames. The inner end, 7, of this driving shaft may be driven in any suitable manner but preferably by an electric motor (not shown) while the outer end thereof carries a circular crank wheel, 8, which revolves in a vertical plane beyond the front edge of the base plate.

Vertical brackets, 9, and, 10, are secured at opposite sides of the base plate adjacent the front edge thereof and one of said brackets, 9, depends from the bottom side while the other bracket, 10, extends vertically above said base but both brackets have position in the same vertical plane. These two brackets 9, and, 10, have position to one side of the central driving shaft and serve to sustain the toe polishing mechanisms. It should be understood that the machine shown in the accompanying drawings is provided with two complete sets of side and toe polishers and that both sets are operated and driven from the same central horizontal driving shaft. These two sets of polishing devices are therefore positioned at opposite sides of the driving shaft so that both shoes may be operated upon simultaneously. As both sets of polishing mechanism have precisely the same construction and operation the same reference characters may be applied to both as a separate and duplicate description of them is unnecessary.

By reference to Figs. 1, 2 and 3 it will be clearly seen that the brackets, 9, and, 10, sustain a vertical guide plate, 11, which is provided at its upper and lower ends with a plurality of vertically-disposed bearings, 12, through which vertical rods, 13, extend. A head, 14, at the upper ends of the vertical rods is provided with sockets, 15, which fit down over said rods so that said rods may sustain the head. In the present instance four rods are employed, and consequently the head is provided with four sockets to fit over the rods and the rods and head are rigidly connected so that a vertical movement of both may be made. At opposite sides the head is provided with a laterally or rearwardly-projecting arm, 16, the inner ends of which are provided with horizontal bearings, 17, as clearly shown in Figs. 2, 3, 10 and 11 and said head is also provided with horizontal bearings, 18, at the upper ends of the sockets, 15. Horizontal shafts, 19, and, 20, are mounted in the bearings, 17, and, 18,—the shaft, 19, having position at the outer side of the head while the shaft, 20, is at the inner side thereof. Both of the shafts project rearwardly beyond the bearings, 17, and said projecting ends carry rolls, 21, which are rigidly mounted on the shafts so that the rolls and shafts must revolve together, as can be clearly seen by reference to Fig. 11. A coiled spring, 22, encircles the shaft, 19, and one end of said spring is attached to one of the stationary bearings, 18, while the other end of said spring is connected to a member, 23, that revolves with the roll on the inner end of said shaft. By the action of the spring, 22, the rotation of the roll may be made but against the action of the spring, and when the roll is released, the spring will cause it to return to its normal position. The shaft, 20, at the opposite or inner side of the head carries a pinion, 24, as shown in detail in Fig. 12, by means of which said shaft may be made to rotate first in one direction and then in a return direction, as will presently be described.

A web, 25, or a strip of any suitable fabric having the necessary polishing characteristics, is wound on the rolls and in the present instance has its ends secured thereto so that it may be run from one roll onto the other and then returned, and during its travel will be brought into contact with the toe of the shoe and wipe across the latter to effect the polishing. Suitable guide rods, 26, are mounted at the inner side of each roll to guide and direct the web during its passage from one roll to the other.

The shafts, 20, at the inner side of the head, 14, are operated by means of racks, 27, which are pivotally connected at their lower ends to the crank wheel, 8, by means of a pin, 28, see Fig. 1. These racks engage the pinions, 24, on the shafts, 20, and as they are moved up-and-down by the revolution of the crank wheel they turn said shafts first in one direction and then in a reverse direction and thus cause the web, 25, to travel back and forth from one roll to the other. In order to allow for the swinging movement which the racks make while they are reciprocating, we provide a swinging guide bracket, 29, having a tubular bearing, 30, see Fig. 12, which is mounted on the shaft 20, between the brackets, 18. This swinging bracket has a U or channel shape so as to receive the rack and hold it in engagement with the pinion. The rack bar is provided with a longitudinal slot, 31, through which the channeled bracket extends. It is obvious that as the crank wheel, 8, revolves the racks will be reciprocated and thereby impart a revoluble movement to the shafts, 20, and the rolls thereon.

The horizontal reciprocating movement of the web in traveling back and forth from one roll to another is one that is very desirable in that it will produce practical results that could not be obtained from a web traveling continuously in one direction. A web or brush that travels in but one direction and which is held in contact against a given point on a leather shoe will heat and burn, and this heating of the polisher prevents the polish compound from giving the luster that it will give if the heating be avoided. The polishing compounds now generally used contain wax properties and undue heating prevents the polish from properly adhering to the leather. Moreover, a polisher moving continuously in one direction will not act with uniformity on all portions of the surface under treatment to the extent that a polisher having a reciprocating movement will do and it is for these practical reasons that we here provide an improved reciprocating polisher. In the operation of this reciprocating polisher we also provide improved means for periodically withdrawing the polisher from polishing contact which also serves a useful purpose in that it enables the web to be intermittently cooled and these two operations of reciprocating the polisher and intermittently removing the polisher from polishing contact are produced by a novel construction and combination of elements over that shown in our prior patent heretofore referred to. In the operation of this toe polisher it has been found desirable to provide a vertical movement thereof for reasons additional to that of maintaining the web cool, for example,—the toes of shoes vary in shape and height and it has been found that if the polisher be moved to and from the shoe in a horizontal or substantially horizontal direction the web at times will not pass over the top of the toe but will strike against the end. By providing a movement that will cause the web and toe to be brought together in a vertical direction this latter objection is overcome, and the devices employed to effect this operation will now be described, references being made particularly to Figs. 1, 2 and 4 of the drawings.

The vertical guide plate, 11, is provided at its upper end with a cross-bar, 32, or other equivalent device having a perforation through which a plunger-rod, 33, extends and the upper end of this rod is rigidly connected to the head, 14, while the lower end passes freely through and is guided by a stationary lug, 34, on the outer face of the guide plate. A block, 35, is rigidly mounted on the plunger rod between the bar, 32, and lug, 34, and in the present instance said lug projects through a vertical slot, 36, in the guide plate directly behind the rod, 33.

Beneath the bed plate, 2, and secured to the under side thereof is a depending bracket, 37, to which a rock lever, 38, is pivotally connected. This rock lever extends beneath the bed plate from front to rear and its forward end and the plunger-rod, 33, are connected by a link or connecting rod, 39. The rear end of the rock lever, 38, is provided with a roller, 40, at its inner side which travels in the groove of a cam, 41, which latter is mounted freely on a horizontal shaft, 42, at the rear and above the bed plate. It is obvious that when the cam, 41, is revolved the lever, 38, will be rocked in a vertical direction and the connection between the forward end of said lever and the plunger rod, 33, will impart a vertical movement to said rod and the polisher head to which it is connected. As shown in the drawings the rod has elevated the head and the polishing web carried thereby. To provide a cushion and thereby prevent jarring and vibrations, we provide coiled springs, 43, and, 44, on the plunger rod, 33, at each side of the block, 35.

From the foregoing it will be understood that as long as the main driving shaft, 6, is revolved the crank wheel, racks and toe polishing web will be operated irrespective of the position of the head and the vertical rods, 13.

The mechanism for driving the cams that operate to raise and lower the toe polisher will now be described.

On the bottom side of the base plate we secure a bracket, 45, which carries the bearing, 5, for the main shaft and which is also provided with a vertical bearing, 46, at one side thereof, as clearly seen in Fig. 2. A vertical shaft, 47, extends through the bearing, 46, and at its lower end carries a beveled gear, 48, which meshes with a pinion, 49, on the main shaft, and the upper end of said vertical shaft extends through a bearing, 50, on the bottom of the bed plate, 2, as shown in detail in Fig. 6. The extreme upper end of the vertical shaft, 47, extends above the bed plate and just above said plate it carries a horizontal gear, 51, and also carries a pinion, 52, immediately on top of the hub of said gear. The shaft, 47, gear, 51, and pinion, 52, all have a central position above the bed plate and with respect to the two side polishing mechanisms so that both sets of side polishers may be driven from said central gear and pinion and thereby work simultaneously. These two side polishing mechanisms are alike both in construction and operation and a vertical sectional detail of one of them is illustrated in Fig. 5 to which attention is directed. At the side of the central gear, 51, the bed plate sustains a vertical tubular support, 53, which has a lower reduced threaded end, 54, that projects through an opening in the base plate and is held in a rigid vertical position by means of a nut, 55, on the lower end thereof. A pinion, 56, is mounted on the tubular support adjacent the base plate, 2, and meshes with the central gear, 51, and is driven in a horizontal plane. This pinion has a sleeve portion, 57, which projects vertically on the tubular support and at its upper end carries a horizontal bevel gear, 58, which is rigid with respect to and revolves with the pinion, 56. The pinion, 56, and bevel gear, 58, revolve at a comparatively high rate of speed while between the two and mounted loosely on the sleeve, 57, we provide a horizontal gear, 59, as shown in Figs. 2 and 3. The gear, 59, meshes with and is driven by the pinion, 52, on the central vertical shaft so that said gear revolves at a low rate of speed. On the bottom of gear, 59, we provide a bevel gear, 60, see Figs. 2 and 3, and a pinion, 61, on the end of a horizontal shaft, 62, is mounted in a bracket bearing, 63, that rests upon the bed plate and the rear end of said shaft is also provided with a pinion, 64, which meshes with and drives a bevel gear, 65, attached to the inner vertical side of the cam, 41. It will thus be seen that the cam, 41, is revolved indirectly from the pinion, 52, on the central vertical shaft, 47, and that said cam makes one revolution for each revolution of the horizontal gear, 59.

By reference to Figs. 2 and 3 it will be noted that the horizontal gear, 59, is provided on its upper side with a bracket bearing, 66, which is rigidly secured thereto, and that the outer end of said bearing is provided with an upwardly-inclined arm with a circular bearing, 67, thereon. A horizontal shaft, 68, is mounted in the bearing, 66, and is provided with a beveled pinion, 69, that meshes with and is driven by the beveled gear, 58, on the tubular support. The outer end of the shaft, 68, is also provided with a pinion, 70, which meshes with the lower teeth, 71, of a double-faced gear, 72, carried on the bearing, 67. A circular flat bearing plate, 73, is mounted on top of the bearing, 67, and is capable of swinging with respect thereto and said plate carries a horizontal bracket, 74, in which a horizontal shaft, 75, is mounted. The outer end of the bracket, 74, is provided with a step-like bearing, 76, in which a vertical shaft, 77, is mounted. The horizontal shaft, 75, is provided at one end with a pinion, 78, that meshes with upper teeth, 79, on the double faced gear, 72, while at its opposite end, said shaft carries another pinion, 80, that meshes with and drives a bevel gear, 81, on the vertical shaft, 77.

From the foregoing description it is to be understood that the horizontal shaft, 75, the vertical shaft, 77, and the driving mechanism connecting them are all mounted or sustained indirectly by the large horizontal gear, 59, and that the bracket, 74, and said shafts, 75, and, 77, have a swinging movement independently of the said gear, 59. The reason for this is that the vertical shaft, 77, carries the side polishing devices and the latter are designed to follow the contour of the foot or shoe and consequently the shaft that carries these devices must be movable to enable the polishing and paste applying brushes to keep close against the shoe during their respective operations.

Above the bracket, 74, the machine is provided with a horizontal table, 82, which has position in a plane that is flush with the front vertical brackets, 10. The tubular supports, 53, also have shoulders, 83, which form central supports while a tubular extension, 84, projects above the table and at its upper end sustains a foot or shoe support, 85. The table, 82, is cut out around the tubular supports, 53, and has a cam plate, 86, which is seated upon and is attached to the shoulder, 83. This cam plate is flush with the top surface of the table and has position in the cut out portion thereof so as to form a cam slot, 87, between the edges of the cut out in the table and the cam plate, as clearly shown in Figs. 3 and 9. The shape of this cam slot, 87, resembles the outline of the bottom of the shoe and the shoe support, 85, and it serves as a guide to direct the polish-applying and polishing brushes as they travel in a circuit about the shoe as will presently be described. The vertical shaft, 77, heretofore described projects up through the cam slot and its projecting end carries a yoke frame, 88, see Figs. 7, 8 and 9.

At the lower end the yoke frame is provided with a horizontally-projecting arm, 89, which trails behind it and which carries a roller, 90, on its under side that travels in the cam slot and serves to direct the yoke frame as it travels in a circuit about the shoe. A swinging bracket frame, 91, that carries the polish-applying mechanism, is mounted on the vertical shaft, 77, between the upper and lower horizontal portions of the yoke frame and this swinging bracket also trails behind said shaft, 77, during their travel in a circuit about the shoe.

A spring, 92, is coiled about the shaft, 77, and has one end attached to the swinging polisher bracket and the action of this spring is to constantly draw the bracket toward the cam-plate, 86, and the shoe support, so that unless it were held away this bracket would move to a position where polish would be applied to the shoe. The fact is then in actual practice this polisher bracket during the entire polishing operation makes twenty circuits around the shoe but during the second, third, fourth and fifth circuits only it is permitted to swing inwardly to the polish-applying position. The devices for causing this swinging movement will presently be described.

The swinging polisher bracket, 91, carries a vertical shaft, 93, the upper end of which is provided with a polish-applying brush, 94. The brush only revolves while it makes its four contact circuits with the shoe and during its travel for the remaining sixteen circuits it is idle. The lower end of this shaft, 93, carries a clutch member, 95, which has a vertical movement on the shaft but is prevented from turning independently thereof. A coiled spring, 96, beneath the clutch member exerts a constant upward pressure thereon and tends to move said member upwardly so that the pins, 97, on its upper surface may engage the pins, 98, on the bottom of the constantly revolving horizontal gear, 99, which normally revolves freely on said shaft, 93. A horizontal shaft, 100, is carried by the swinging bracket, 91, and the outer end of this shaft is provided with a pinion, 101, which meshes with and drives the gear, 99, while the inner end of said shaft carries a beveled gear, 102, which is driven by a horizontal pinion, 103, on the vertical shaft, 77. As the vertical shaft, 77, is constantly revolved, the horizontal shaft, 100, and the normally loose gear, 99, on the shaft, 93, will also be constantly revolved.

The devices employed for swinging the polisher bracket, 91, and the mechanism carried thereby from the operative to the inoperative position will now be described.

By reference to Figs. 2, 4, and 6 it will be seen that the central vertical shaft, 47, carries a small pinion, 104, which has position just below the bed plate, 2, and which meshes with and drives a horizontal gear, 105, that is hung from the bottom side of the bed plate and to the rear of the central vertical shaft. A pinion, 106, on top of the gear, 105, is driven by the said gear and this pinion drives a horizontal gear, 107. A circular cam plate, 108, see Figs. 6 and 13, is carried on the bottom of the gear, 107. Brackets, 109, are secured to the bottom of the bed plate and depend therefrom and said brackets pivotally sustain levers, 110, which are connected at their rear ends by a cross-bar, 111. This cross-bar, midway between the levers, carries a lug or projection, 112, which contacts with the bottom face of the circular cam-plate, 108, so that as said plate makes one revolution, a vertical rocking movement will be imparted to the levers, 110. The movement of this cam-plate is very slow and in fact makes but one revolution during the entire polishing operation, while the cut-out portion thereof is utilized to bring the polish-applying devices against the shoe and represents one-fifth of the revolution. The forward ends of the rocking levers, 110, turn laterally, as clearly seen in Fig. 4, and terminate at a point beneath the tubular supports, 53, on the bed-plate. A vertical rod, 113, extends through the tubular support and the lower end of this rod is pivotally connected to the forward end of the lever, 110, see Fig. 5, so that when the rear end of the lever is depressed by the cam-plate, 108, the forward end thereof will be raised and the vertical rod, 113, elevated, as shown in Fig. 2. The vertical rod, 113, in Fig. 5 is shown in the lowered position which it takes when the cut-out portion of the cam plate permits the rear end of the lever, 110, to be raised during which period the polish-applying brush, 94, is swung inwardly against the shoe. The upper end of the vertical rod, 113, even when said rod is depressed, has position in a plane above the cam-plate, 86, that guides the polishing devices in their circuit about the shoe, and said rod end is movable in the tubular extension, 84, of the support, 53. This tubular extension is provided at its lower end with vertical slots, 114, through which a horizontal pin, 115, extends after having been passed through the rod. A sleeve, 116, surrounds said tubular extension, 84, and rests upon the projecting ends of the pin, 115, and said sleeve is provided with tubular horizontal side supports or brackets, 117, which receive horizontal rods, 118. These rods are loose in the side supports or brackets and may move longitudinally therein while the rods and sleeve may both turn freely on the support, 84. The forward projecting ends of the rods, 118, are connected by a cross bar, 119, see Figs. 7, 8 and 9 which holds the rods rigidly together, and which has position in a horizontal plane between the upper and lower arms of the yoke frame, 88.

By reference to Fig. 8, it will be seen that the yoke frame, 88, carries two vertical rigid rods, 120, and, 121, and that the cross bar, 119, is pivotally mounted on the rod, 120. In addition to being pivoted to the bar, 120, said cross-bar is also movable thereon in a vertical direction so that when the vertical rod, 113, is raised or lowered the horizontal rods, 118, and cross-bar, 119, may also be raised or lowered. It is this vertical movement of the cross bar that causes the frame, 91, to swing one way or the other. A vertically movable block, 122, is mounted on the rods, 120, and, 121, and seats on the pivoted bar, 119, so that said bar and block move in a vertical direction together. This block is provided with an arm, 123, which carries a lug or stem, 124, at one side and a cam plate, 125, is mounted at the side of the swinging bracket frame, 91, which curves around and projects over said lug or stem as shown in Figs. 7 and 9. It is to be understood, therefore, that when the block, 122, is raised the stem, 124, will contact with the inclined surface of the cam plate, 125, and cause said plate to move laterally or swing away from the block and as said plate is rigid on the swinging bracket frame, 91, the latter and all the devices carried by it, including the shaft, 93, and polish-applying brush, 94, will be swung away from the block, 122, thus throwing the polish-applying brush out of contact with the shoe. This movement is made against the action of the coiled spring, 92, and this condition will prevail so long as the vertical rod, 113, is held up or elevated by the cam-plate, 108, which in the present instance is during sixteen revolutions or circuits of the polisher mechanism about the shoe. While the polish-applying brush, 94, is held away from the shoe it is desirable to stop its revolution so that it will not collect the paste from the paste receptacle, 126, when not in actual use.

The paste receptacle, 126, is mounted in an arm, 127, that is carried by the bracket frame, 91, so that it may move with the latter toward and from the shoe. This receptacle is substantially like the one shown and described in our prior patent 794,540 hereinbefore referred to and a detailed description of the same is therefore unnecessary, it being deemed sufficient to state that it has a concave open side that fits closely about the brush, 94, so that the latter in revolving will collect the paste and apply it to the shoe.

In order to stop the revolution of the polish-applying shaft, 93, we provide the clutch member, 95, with a circumferential groove, 128, and to the side of the bracket, 91, we pivotally mount a lever, 129, which has a bifurcated end which straddles the clutch member and projects into the groove thereof. The other end of the lever, 129, projects over the block, 122, and between the rods, 120, and, 121, so that as said block is moved vertically to swing the bracket the lever, 129, will be correspondingly operated to raise or lower the clutch member. When the block is raised as in Fig. 7, the bifurcated end of the lever, 129, will be lowered and thus the clutch member will be depressed from engagement with the pins, 98, on the continuously-revolving loose gear, 99, and the shaft, 93, will remain idle.

The polisher brush, 130, is mounted on a vertical shaft, 131, which is carried in a swinging bracket, 132. This bracket is pivotally mounted on the vertical shaft, 77, and a gear, 133, on the upper end of said shaft meshes with a gear, 134, on the polisher shaft, 131, and drives the latter. A coiled spring, 135, around the shaft, 77, serves to press the swinging bracket, 132, and the polisher brush inwardly toward the shoe support so as to provide a yielding contact between the brush and the shoe under treatment. An arm, 136, is pivotally mounted on the shaft, 77, and carries a roller, 137, at its outer end which travels in the cam slot, 87, and the upper side of said arm is provided with a vertically-projecting lug or stop, 138, against which the bracket, 132, may contact to limit the movement of said bracket in a direction toward the shoe.

In practice the machine is operated by an electric motor and after the brushes have made the requisite number of circuits around the shoe the motor is cut out and the machine stopped. While this particular mechanism forms no part of the present application a portion of it is shown in Figs. 4 and 6 and will be briefly described.

On top of the horizontal gear, 107, we secure a disk or plate, 139, having a notch, 140, at one point in its circumferential edge. A pivoted lever, 141, is mounted on the base plate, 2, and has a hook, 142, at its inner end. This lever is continuously drawn so as to keep the hook pressed in toward the circumference of the disk, by means of devices that throw a switch not shown. As the disk revolves slowly with the gear, 107, the hook will ride against the circumference thereof until one complete revolution has been made whereupon the hook will drop into the notch 140, and cause the operation of the switch to cut off the current.

In the operation of the machine the polisher brush, 130, makes one orbital movement or circuit around and in contact with the shoe to brush off the dust; the polish-applying brush being held away from the shoe during this first circuit. The polish-applying brush then swings into contact with the shoe behind the polisher and both brushes then make four orbital movements, about the shoe. The polish-applying brush then swings away from the shoe and the polishing brush continues its circuits until the operation is complete. During the orbital movements of the side polishing brushes about the shoe the toe polisher is also operating, but as the side polishers reach the toe the cams, 41, which make one revolution for each circuit made by the side polishers, will cause the toe polisher to be elevated long enough to permit the side polishers to pass beneath it and then drop again and continue its toe polishing operation.

The reciprocating back-and-forth movement of the toe polishing web is one that is very desirable in the polishing of a shoe, for the reason that it enables a cloth to be used which is the best known polishing medium and it causes a rubbing of the leather in both directions which produces a polish that can only be equaled by hand.

Having thus described our invention what we claim and desire to secure by Letters Patent is,—

1. In a shoe-polishing machine the combination with a side polisher, of a single stretch of toe-polishing fabric; revoluble devices engaging the ends of and sustaining the fabric, and means for operating the revoluble devices first in one direction and then the other to reciprocate the fabric back and forth across the toe.

2. In a shoe-polishing machine the combination with a shoe-support, of revoluble devices at opposite sides of the shoe-support; a fabric having its ends wound on said devices, and means for operating said devices and transferring the fabric from one device to the other above the shoe support and in contact with the shoe.

3. In a shoe-polishing machine the combination with a shoe-support, of revoluble devices at opposite sides of the shoe-support; a fabric having an end connected with each of said devices and extending across the shoe support; means for operating said devices to rapidly wind the fabric on one of them and means for reversing the operation of said devices to rapidly wind the fabric onto the other.

4. In a shoe-polishing machine the combination with a shoe-support of a polisher for operating at the sides of the shoe-support; revoluble devices adjacent the toe; a single stretch of traveling fabric operated by the revoluble devices simultaneously with the operation of the side polisher, and means for reversing the direction of travel of said stretch of fabric to reciprocate it over the shoe support.

5. In a shoe-polishing machine the combination with a side polisher, of two revoluble devices sustained at opposite sides of the toe; a fabric attached to and reciprocated by said two revoluble devices, and means for raising and lowering the revoluble devices and fabric with respect to the toe.

6. In a shoe-polishing machine the combination with a side polisher, of means for moving said polisher around the shoe; revoluble devices sustained at opposite sides of the toe; a fabric reciprocating between said revoluble devices, and means for raising the fabric and revoluble devices to permit the side polisher to pass beneath them around the toe.

7. In a shoe-polishing machine the combination with a side polisher, of means for moving the side polisher in a circuit around the shoe; two spaced-apart rolls adjacent the toe; a polishing fabric having its ends connected with said rolls; means for running the fabric back and forth between the rolls, and means for intermittently raising and lowering the rolls and fabric.

8. In a shoe-polishing machine the combination with a side-polisher, of a head; two spaced-apart rolls carried by the head; a fabric connecting the two rolls; means for drawing the fabric in a horizontal direction from one roll and winding it onto the other, and means for returning the fabric from the latter to the former roll.

9. In a shoe-polishing machine the combination with a side polisher, of a head; two spaced-apart rolls carried by the head; a fabric connecting the two rolls, and a rack and pinion for turning the rolls to cause the fabric to travel from one roll to the other.

10. In a shoe-polishing machine the combination with a side polisher, of a head; spaced-apart horizontal shafts carried by said head; a roll carried on each shaft; a fabric connecting the rolls; means for turning one shaft to transfer the fabric from one roll to the other, and means for turning the roll on the other shaft to return the fabric to the roll from which it came.

11. In a shoe-polishing machine the combination with a side polisher, of a head; spaced-apart horizontal shafts carried by said head; a roll carried on each shaft; a fabric connecting the rolls; a reciprocating rack; a pinion on one shaft and operated by the rack to turn the roll of that shaft to wind the fabric thereon, and means operative on the other shaft for returning the fabric.

12. In a shoe-polishing machine the combination with a support for the shoe, of a side polisher to operate along the side of the support; a horizontal roll at each side of the toe-end of the shoe support; a fabric having its opposite ends connected to the two rolls, and means for turning the rolls intermittently in opposite directions and to reciprocate the fabric across the toe-end of the support while the side polisher is operating along the side.

13. In a shoe-polishing machine the combination with a shoe support of a vertical shaft at the side of said support; means for moving said shaft in a circuit about the support; a swinging bracket carried by said shaft and trailing behind the latter; a shaft carried by said bracket; a polish-applying device operated by said bracket shaft; means for driving said bracket shaft from the vertical shaft,—and means for stopping the revolution of the bracket shaft while the vertical shaft is making its circuit; a polisher also sustained by said vertical shaft and means for operating the polisher from said shaft.

14. In a shoe-polishing machine the combination with a shoe support of a revoluble side polisher; means for moving the revolving polisher in a circuit about the support; a head sustained in front of the shoe support; a reciprocating fabric sustained by said head, and means for raising the head and fabric to permit the revoluble side polisher to pass beneath it.

15. In a shoe-polishing machine the combination with a shoe support of a revoluble side polisher; means for moving the revolving polisher in a circuit about the support; vertical rods sustained in front of the shoe support; a head carried by said rods; rolls revolubly sustained by said head; a fabric reciprocating between said rolls, and means for moving said rods and head vertically to elevate the fabric.

In testimony whereof we affix our signatures in presence of two witnesses.

HERBERT R. OLIVER.
GEORGE P. OHLGART.

Witnesses:
CHAS. B. MANN,
G. FERDINAND VOGT.